United States Patent [19] [11] 4,154,622
Momoi et al. [45] May 15, 1979

[54] GRANULAR PIGMENT COMPOSITION

[75] Inventors: Yasutaka Momoi, Koshigaya; Masateru Yamane, Saitama, both of Japan

[73] Assignee: Dainichiseika Color & Chemicals Mfg. Co., Ltd., Tokyo, Japan

[21] Appl. No.: 808,614

[22] Filed: Jun. 21, 1977

[51] Int. Cl.$^2$ ................................................ C08J 3/12
[52] U.S. Cl. ............................ 106/308 F; 106/308 Q; 106/309; 264/176 R
[58] Field of Search .............. 106/308 F, 308 Q, 309; 264/176 R

[56] References Cited

U.S. PATENT DOCUMENTS

| | | | |
|---|---|---|---|
| 2,386,885 | 10/1945 | Downs et al. | 106/308 F |
| 2,929,733 | 3/1960 | Kebrich et al. | 106/308 F |
| 2,987,412 | 6/1961 | Csonka et al. | 106/308 F |
| 3,424,832 | 1/1969 | Chisholm | 264/176 R |
| 3,458,804 | 7/1969 | Wolf et al. | 106/309 |
| 3,615,809 | 10/1971 | Nagle | 106/308 F |
| 3,646,894 | 3/1972 | Hasten et al. | 264/39 |
| 3,656,982 | 4/1972 | Chapman et al. | 106/308 F |
| 3,951,849 | 4/1976 | Vickery et al. | 106/308 F |

*Primary Examiner*—Patrick Garvin
*Assistant Examiner*—J. V. Howard
*Attorney, Agent, or Firm*—Oblon, Fisher, Spivak, McClelland & Maier

[57] ABSTRACT

Disintegratable granular pigment composition comprises a pigment and a dispersing agent such as higher fatty acids or metal salts of higher fatty acids.

The disintegratable granular pigment composition is prepared by mixing a pigment and a dispersing agent and adding a wetting liquid to form a plastic mixture and granulating the plastic mixture.

4 Claims, No Drawings

GRANULAR PIGMENT COMPOSITION

BACKGROUND OF THE INVENTION

1. Field of the Invention

The present invention relates to a novel pigment compositions which are useful for various usages especially as coloring agents for thermoplastic resins and a process for preparing the same. More particularly, it relates to a novel pigment composition which is remarkably suitable for using in the direct feeding type coloring method which has been developed together with improving characteristics in the dry color, the color master batch, the colored pellets etc.

2. Description of the Prior Arts

It has been known to use as the coloring compositions for coloring thermoplastic resins, the dry colors prepared by mixing and pulverizing a pigment and a metal soap, the color master batch prepared by dispersing a pigment into a thermoplastic resin at high content and a liquid color prepared by dispersing a pigment into a liquid.

These known coloring compositions have certain disadvantages though they have certain advantages. For example, the dry color is economical, but it is fine powder which is easily scattered to cause a staining in a factory and which tends to uneven distribution to easily cause uneven coloring. Moreover, it is fine powder whereby an automatic measurement of the dry color is difficult and the dry color may not be used as the coloring composition in the direct feeding type coloring method. The color master batch has not the disadvantages as those of the dry color, but the process for preparing the color master batch is not easy so that it is expensive and a heat treatment is applied to the carrier resin for a long time to deteriorate physical characteristics of the colored materials of the resins. The liquid color has disadvantages of remaining the unvaporized liquid in the colored material to remarkably deteriorate physical properties of the colored materials.

SUMMARY OF THE INVENTION

It is an object of the present invention to overcome the above-mentioned disadvantages of the known coloring compositions.

It is another object of the present invention to prevent the staining caused by scattering a coloring composition.

The foregoing and other objects of the present invention have been attained by preparing a disintegratable granular pigment composition by granulating a plastic mixture of a pigment and a dispersing agent under a specific condition.

DETAILED DESCRIPTION OF THE PREFERRED EMBODIMENTS

The term of pigments means both of the conventional dyes and pigments.

Suitable pigments include phthalocyanines, anthraquinones, quinacridones, indigoids, thioindigoids, azo, quinophthalones, dioxazines, perynones, perylenes, isoindolinones, aniline black, cadmium compounds, titanium oxides, zinc oxides, carbon blacks, iron oxides, chromium oxides, chrome yellow, as well as body extender pigments such as barium sulfate, barium carbonate, calcium carbonate, silica, clay, alumina, talc and dyed pigments prepared by dyeing the body extender pigments with a water soluble dye.

The dispersing agents used in the present invention can be the dispersing agents used in the preparation of the conventional dry colors.

Suitable dispersing agents include higher fatty acids such as stearic acid, lauric acid, ricinoleic acid, naphthenic acid, 2-ethyl hexenoic acid, octylic acid; and these metal salts such as zinc, calcium, magnesium, aluminum, barium, cadmium, strontium, lead, tin and lithium salts; and mineral or vegetable waxes such as polyethylene wax, polypropylene wax, microcrystalline wax; and synthetic waxes such as polyethyleneglycols. One or more dispersing agents can be used.

In the present invention, it is optimum to use higher fatty acids or metal salts of fatty acids.

The pigment and the dispersing agent are indispensable components of the pigment composition of the present invention. Thus, it is possible to add suitable conventional additives such as surfactants, ultraviolet absorbers, antistatic agents, flame retardants, blowing agents etc. if desired.

The object compositions of the present invention can be obtained by mixing the indispensable components and the other additive and granulating the mixture.

It is advantageous not to substantially use a high molecular weight binder used for binding fine particles in the conventional granulating method, such as various organic solvent solutions of resins (for example, Japanese Patent Publication No. 16059/1976) or water soluble high molecular weight binders such as polyvinyl alcohol, polyacrylic acid, polyethyleneglycol, carboxymethyl cellulose. This is the first feature of the present invention though it is possible to use the high molecular weight binder in a content and a condition not to deteriorate the disintegratable property of the granular pigment composition.

The inventors have found that the granulation can be easily attained by adding suitable amount of a wetting liquid to a powdery mixture of the pigment and the dispersing agent to form a plastic mixture and extruding the plastic mixture through a screen having suitable size to form granules. The resulting granules are in a form of beads having suitable strength and are remarkably useful as the coloring composition used in the direct feeding type coloring method.

The second feature of the present invention is not to dissolve or melt the dispersing agent in the granulation. In the conventional granulating method, the granulation is attained by causing tackiness to a component having a low melting point by heating it or by dissolving it in a medium. However, in accordance with the conventional granulation, the beads having suitable strength and disintegratable property for the direct feeding type coloring method could not be obtained.

The inventors have found that when a wetting liquid which does not substantially dissolve the dispersing agent such as water is added to the mixture of the pigment and the dispersing agent at a ratio of forming a plastic mixture and the plastic mixture is extruded through a screen having suitable size to granulate it, it is possible to obtain the granular pigment composition which has enough strength to be durable in the preparation, drying, weighing, packaging operations and does not cause scattering and staining trouble and has improved dispersing property and can be easily disintegrated into the original fine powder mixture by impact force of resin pellets in the operation mixing the pigment composition with the resin pellets as the colored material.

The above-mentioned special characteristics of the granular pigment composition of the present invention can be given because a tackifier such as higher molecular weight binder is not substantially used in the granulation and the dispersing agent is not dissolved nor melted.

The granular pigment composition of the present invention can be prepared by uniformly mixing the pigment and the dispersing agent and adding suitable amount of a wetting liquid to form a plastic mixture and extruding the plastic mixture through a screen having suitable size to granulate and drying it.

In the process, the amount of the dispersing agent is usually in a range of about 0.1 to 5 wt. part per 1 wt. part of the pigment preferably 0.3 to 3 wt. parts in the case of the organic pigments; and about 0.1 to 1 wt. part in the case of the inorganic pigment.

The wetting liquid is preferably water. In order to improve the wetting property, it is preferably to contain about 0.01 to 10 wt. parts of a surfactant per 100 wt. parts of water.

The surfactants can be the conventional wetting agents. The amount of the wetting liquid is to give plastic property to the mixture of the pigment and the dispersing agent, that is to be more than forming a cake but less than forming a fluid, and it is usually in a range of about 20 to 150 wt. parts per 100 wt. parts of the mixture of the pigment and the dispersing agent.

The plastic mixture is extruded through a screen having suitable size. The size of the screen is quite important, and it is highly related to the automatic measurable property in the direct feeding type coloring method.

When a screen having an average diameter of about 0.1 to 5 mm preferably about 0.5 to 3 mm is used, the optimum automatic measuring property can be given for the granular pigment composition.

When the size is smaller, the granular pigment composition causes a bridging phenomenon to disturb smooth automatic measurement. On the other hand, when the size is larger, the granular pigment composition has inferior strength to disintegrate it so as to form fine powder in the automatic measuring step, and to disturb smooth automatic measurement.

Accordingly, it is preferable to give an average diameter of the granular pigment composition of the present invention in a range of about 0.1 to 5 mm.

Thus, the resulting granular product is dried. In the process of the present invention, it is preferable to dry it at the temperature to prevent substantial melting of the dispersing agent in the granular product. The temperature is depending upon the melting point of the dispersing agent and it is usually in a range of about 50° to 120° C. When it is higher to melt the dispersing agent, the disintegratable property of the granular pigment composition is inferior.

The resulting granular pigment composition of the present invention has the same with the conventional fine dry color except the physical properties and shapes, and can be used for various coloring purposes. The main usages are the same with those of the conventional dry color, colored pellets, color master batches to color thermoplastic resins such as polyethylene, polypropylene, polystyrene, polyvinyl chloride, polyvinylidene chloride, polyacrylic acid esters, AS copolymers, ABS copolymers, polyamides, polyesters, polycarbonates etc.

The granular pigment composition of the present invention has not the disadvantages of the conventional dry color and has excellent pigment dispersing property, low staining property and easy handling property as those of the color master batch though the complicated manufacturing steps as the preparation of the color master batch, are not required to be economically advantageous and it has not heat treatment of resins caused in the case of the conventional color master batch or colored pellets.

The granular pigment composition of the present invention is remarkably suitable for the automatic measurement. On the other hand, when it is mixed with the resin pellets, it is easily disintegrated by shock in the mixing step. Accordingly, it is optimum to use it in the direct feeding type coloring method which has been developed. The present invention will be illustrated by certain examples wherein the term of part or percent means part or percent by weight.

EXAMPLE 1

A 80 parts of titanium oxide and 20 parts of zinc stearate were thoroughly mixed, and 30 parts of 2% aqueous solution of a surfactant was added and the mixture was kneaded.

The resulting plastic mixture was extruded by an extruder equipped with a screen (about 1.0 mm) at room temperature and the resulting granular material was dried at about 80° C. to 100° C. to obtain the granular pigment composition having 0.5 to 1.0 mm of an average diameter. The resulting granular pigment composition had no disadvantage of scattering and staining in the drying, transferring weighing and packaging operations.

The granular pigment composition was added to polyethylene pellets at a ratio of 1.0 part to 100 parts of polyethylene pellets and they were mixed in a tumbler whereby the granular pigment composition was easily disintegrated and fine powder was uniformly adhered on the surface of polyethylene pellets and the uneven distribution of the fine powder was not found.

EXAMPLE 2

A 50 parts of carbon black and 50 parts of magnesium stearate were throughly mixed and then, 100 parts of 2% aqueous solution of a surfactant was added and the mixture was kneaded.

The resulting plastic mixture was extruded by an extruder equipped with a screen (about 1.2 mm) at room temperature and the resulting granular material was dried at about 90° to 110° C. to obtain the granular pigment composition having about 0.7 to 1.2 mm of an average diameter.

The resulting granular pigment composition had no disadvantage of scattering and staining as the same with those of Example 1.

The granular pigment composition was directly fed together with polyethylene pellets on a screw of resin feeder of a screw type injection molding machine at a ratio of 0.5 part of 100 parts of polyethylene pellets to prepare containers at a molding temperature of 230° C. to obtain the containers which were uniformly colored in black without uneven color. The granular pigment composition could be quantatively fed in high accuracy and a clogging trouble of a measuring device was not found.

EXAMPLE 3

A 60 parts of copper phthalocyanine Blue and 40 parts of calcium stearate were thoroughly mixed and 80 parts of 2% aqueous solution of a surfactant was added and the mixture was kneaded.

The resulting plastic mixture was extruded by an extruder equipped with a screen (about 0.8 mm) at room temperature, and the resulting granular material was dried at about 80° to 100° C. to obtain the granular pigment composition having about 0.5 to 1.0 mm of an average diameter.

The resulting granular pigment composition had no disadvantage of scattering and staining as the same with those of Example 1.

The granular pigment composition was directly fed together with polystyrene pellets on a screw of resin feeder of a screw type injection molding machine by an automatic measuring device at a ratio of 0.7 part to 100 parts of polystyrene pellets at a molding temperature of 230° C. and a mold temperature of 30° C. under an injection pressure of 50 Kg/cm$^2$ to obtain a plate which were uniformly colored in blue without uneven color. The granular pigment composition could be quantatively fed in high accuracy and uneven color or uneven dispersion were not found and a clogging trouble of a measuring device was not found.

What is claimed is:

1. A process for preparing a disintegratable granular pigment composition which comprises the steps of:
   (1) forming a plastic but not a fluid mixture by uniformly mixing a mixture which comprises:
      a pigment;
      a dispersing agent selected from the group consisting of higher fatty acids and metal salts of higher fatty acids, wherein said dispersing agent is present in an amount of from 0.1 to 5 weight parts per 1 weight part of said pigment; and
      a wetting liquid which does not appreciably dissolve said dispersing agent, wherein said wetting liquid is present in an amount of from 20 to 150 weight parts per 100 weight parts of said pigment plus said dispersing agent;
   (2) granulating said plastic mixture to form particles having an average particle diameter of from 0.1 to 5 mm; and
   (3) drying said particles at a temperature of from 50° to 120° C., wherein the drying temperature is selected to prevent substantial melting of said dispersing agent in the granular product.

2. A process according to claim 1 wherein said wetting liquid contains about 0.01 to 10 wt. % of a surfactant.

3. A process according to claim 1 wherein the granulation is carried out by extruding the plastic mixture through a screen having an average pore diameter of about 0.1 to 5 mm.

4. The process of claim 1, wherein said wetting liquid is water.

* * * * *